United States Patent
Campbell et al.

[11] Patent Number: 5,837,308
[45] Date of Patent: Nov. 17, 1998

[54] OIL/WATER EMULSION HEAT-STABILIZED WITH PROTEIN AND DATEM

[75] Inventors: Lydia Campbell, Waldprechtsweiermalsch; Hans Uwe Trueck, Stuttgart, both of Germany

[73] Assignee: Nestec S.A., Vevey, Switzerland

[21] Appl. No.: 521,399

[22] Filed: Aug. 29, 1995

[30] Foreign Application Priority Data

Sep. 24, 1994 [EP] European Pat. Off. ............ 94115076

[51] Int. Cl.⁶ ..................................................... A23J 1/00
[52] U.S. Cl. .......................... 426/604; 426/602; 426/613
[58] Field of Search ...................... 426/602, 604, 426/613

[56] References Cited

U.S. PATENT DOCUMENTS

| | | | |
|---|---|---|---|
| 4,242,364 | 12/1980 | Buddemeyer | 426/658 |
| 4,734,287 | 3/1988 | Singer | 426/605 |
| 4,794,015 | 12/1988 | Fujita . | |
| 4,855,156 | 8/1989 | Singer | 426/570 |
| 4,985,270 | 1/1991 | Singer | 426/572 |
| 5,145,702 | 9/1992 | Stark | 426/531 |
| 5,213,968 | 5/1993 | Castle et al. . | |
| 5,254,356 | 10/1993 | Busken | 426/604 |
| 5,308,639 | 5/1994 | Fung . | |
| 5,314,706 | 5/1994 | Colarow et al. . | |
| 5,330,778 | 7/1994 | Stark | 426/531 |
| 5,362,512 | 11/1994 | Cabrera | 426/604 |
| 5,501,869 | 3/1996 | Buliga et al. | 426/538 |
| 5,652,011 | 7/1997 | Heertze | 426/601 |

FOREIGN PATENT DOCUMENTS

| | | |
|---|---|---|
| 0251020 | 7/1988 | European Pat. Off. . |
| 0558113 | 1/1993 | European Pat. Off. . |
| 0547647 | 6/1993 | European Pat. Off. . |
| 61-209562 | 9/1986 | Japan . |
| 5030906 | 2/1993 | Japan . |
| 1525929 | 9/1978 | United Kingdom . |
| 9317582 | 9/1993 | WIPO . |

*Primary Examiner*—Carolyn Paden
*Attorney, Agent, or Firm*—Vogt & O'Donnell, LLP

[57] ABSTRACT

An emulsion which does not contain egg yolk and which is heat-stable when the emulsion is pasteurized or sterilized is prepared by adding oil to an aqueous mixture of ingredients and emulsifying and contains, for obtaining emulsion physical stability and as an emulsifier, a protein and DATEM alone. The emulsion, which has a pH of from 3 to 8, is prepared with the water and with, by weight, from 5% to 75% oil, from 0.1% to 10% vinegar, from 0.1% to 10% protein and from 0.1% to 5% DATEM and with at least one of salt and sugar. When the emulsion is prepared, the noted ingredients are mixed with the water component, the oil is added and emulsified with the mixture and then the vinegar is added.

27 Claims, No Drawings

OIL/WATER EMULSION HEAT-STABILIZED WITH PROTEIN AND DATEM

BACKGROUND OF THE INVENTION

This invention concerns a heat-stable, oil-in-water emulsion containing between 5 and 75% fat, between 0.1 and 10% vinegar, salt and/or sugar, aroma and water. The invention relates further to a process for the manufacture of said emulsion. The emulsions may be used in the production of emulsified food products.

Japanese Patent Application of Asahi Foods KK No. 61209562 describes the manufacture of an oil-in-water emulsified composition containing oil, fat, protein and a mixture of three different emulsifiers. The composition is heat-stable but, because of the three emulsifiers, is expensive. It is also less accepted by consumers and has a bad taste due to the presence of lecithin.

SUMMARY OF THE INVENTION

An object of this invention is to provide a heat-stable, oil-in-water emulsion containing fat and an emulsifier which is not egg yolk and which has good stability, viscosity, smoothness, taste and colour properties.

Accordingly, this invention provides a heat-stable emulsion of oil and water comprised of from 5% to 75% food-grade oil, from 0.1% to 10% vinegar, salt and/or sugar, and water and which is characterized in that it further contains from 0.1 to 5% diacetyl tartaric acid ester of monoglyceride (referred to as DATEM in this specification) and from 0.1 to 10% protein and having a pH of 3 to 8.

The present invention also provides a process for preparation of the emulsion wherein salt and/or sugar, DATEM and a protein are mixed together with water, and then oil is added and emulsified with the aqueous mixture. Vinegar is added after the emulsification, although it is possible to add the vinegar prior to emulsification. The process, particularly for preparation of a sauce, may include a further step of homogenizing after the vinegar addition.

DETAILED DESCRIPTION OF THE INVENTION

In this application, the percentages are by weight and the protein and DATEM percentages are given by dry weight.

DATEM is known in the art as an emulsifier, but if used alone, the obtained oil-in-water emulsion, although heat-stable, is too liquid and does not yield a product with the required physical properties, such as viscosity, to be successfully launched on the market.

Similarly, proteins like casein are also known for their emulsifying function, but if used alone, the obtained oil-in-water emulsion usually would not be heat-stable. Hence, although the emulsion might have high viscosity, it would not lead to products which have smooth texture and acceptable emulsion stability.

Surprisingly however, DATEM and protein when combined in an oil-in-water emulsion lead to a synergistic effect in that the emulsion is heat-stable and also has very good physical properties, such as emulsion stability, smoothness and viscosity.

Preferably, the amount of DATEM used is from 2 to 3%. Preferably the amount of protein used is from 2 to 5%.

The type of protein used is not critical. The protein may be selected from skim milk powder, casein, whey protein, pea protein and soya protein. Skim milk powder is preferred because it is significantly lower in price and better in colour and taste than the other mentioned proteins.

From a general point of view, the obtained emulsion is heat-stable, meaning that it can withstand UHT-treatment (less than one min at 140° C.) or sterilization at 110° C. for 10 minutes.

The oil-in-water emulsion may be a mayonnaise-product, a spread or a sauce. By oil, we mean all food-grade oils such as soy-bean oil, sunflower oil, grapeseed oil, peanut oil, butter oil and also butter fat. For the mayonnaise and spread, the emulsion is produced without heat-treatment. On the contrary, for a sauce, the production process includes heat-treatment, such as pasteurization or sterilization.

For a mayonnaise-like product, i.e., a product with a high fat content, the product preferably contains from 50 to 75% oil and has a pH of 3 to 5. Such a product has a viscosity comparable to that of normal mayonnaise, has a creamy appearance, good emulsion stability, a smooth texture and is shelf-stable for 6 months at room temperature. However, unlike mayonnaise, the product does not contain egg yolk.

For a spread, the oil content is preferably from 20 to 75% and the shelf-stability is between 6 and 12 months at room temperature. In the case of a sauce, the emulsion preferably contains from 5 to 50% oil and from 1 to 30% butter and is shelf-stable for 12 months at room temperature.

The amount of salt and sugar used is preferably from 0.1–3% salt and 0.1–30% sugar. Aromas and ingredients which lead to savoury or sweet products may also be added.

The emulsion may be prepared by simply mixing together the aqueous phase ingredients, such as water, salt and/or sugar, aroma, DATEM and proteins without intense mechanical shearing. After that, the oil is slowly added and the obtained mixture is emulsified. Emulsification can be carried out with any suitable mechanical equipment, such as a colloid mill or an homogenizer. After emulsification, the vinegar is added. It is also possible, according to the invention, to add directly to the aqueous phase, before emulsification, the oil and the vinegar, either mixed together or separately.

Usually the vinegar must be added after emulsification, otherwise the obtained emulsion is thin and has a sandy texture, with no or reduced emulsion stability.

In the case of the manufacture of a sauce, an homogenization takes place after the vinegar has been added.

EXAMPLES

The Examples below described by way of illustration only.

In the examples, physical stability of mayonnaises is measured by subjecting it to centrifugation and observing the separation of oil and serum.

Heat stability of mayonnaises is tested by heating 10 ml of emulsion in a test tube in a boiling water bath for 30 minutes. Heat-stability of sauces is tested by UHT treating (140° C. for 10 sec.) or sterilising (110° C. for 10 min). After cooling, a 100 ml sample is reheated in a microwave oven (650 watt) at maximum setting for 2 min. Alternatively, 500 ml is reheated to boiling point in a glass beaker on a kitchen hot plate. The emulsions are judged visually, and emulsions showing protein coagulation or oil separation are considered unstable. Structural properties such as roughness and smoothness are determined from the visual appearance of the emulsion. Expert opinion is used.

Comparative Examples 1 to 4: Mayonnaise

Water, salt (0.8%), sugar (1%), mustard aroma (0.1%) and 2% skim milk powder are mixed (3000 rev/min for 2 min)

in a 2 kg Stephan mixer at room temperature. The oil is added slowly (30 seconds) and the mixture is emulsified at 3000 rev/min for 1.5 min (0.5 bar vacuum). The results are given herein-below with 3 different proteins and DATEM separately (the percentage of each component is always 2, except for Example 2 where it is 1%).

| Example | Emulsifier | Protein | Viscosity (mPas) | Stability after centrifugation serum/oil (ml) | Structure |
|---|---|---|---|---|---|
| 1 | — | skim milk powder | 2420 | 2.2/0 | rough |
| 2 | — | caseinate | 2700 | 2.5/0 | rough |
| 3 | — | soya protein | 960 | 2.5/0.1 | smooth |
| 4 | DATEM | — | 325 | 0.5/0 | smooth |

The viscosity is measured using a Bohlin CS viscometer.

In each case, (except DATEM) the stability is bad corresponding to a release of more than 2 ml of serum, or a release of any oil, per 8 ml of emulsion.

A viscosity of 1500 mPa is considered as acceptable, which is the case for examples 1 and 2, but the product structures are rough.

The compositions are thermally unstable except with DATEM alone.

Examples 5 to 7: Mayonnaise

The procedure mentioned for examples 1 to 4 is repeated, but instead of adding DATEM alone or protein alone, DATEM and protein are added together. The results are given in the following table.

| Example | Emulsifier | Protein | Viscosity (mPas) | Stability after centrifugation serum/oil (ml) | Structure |
|---|---|---|---|---|---|
| 5 | DATEM | skim milk powder | 4290 | 1.0/0 | smooth |
| 6 | DATEM | caseinate | 3920 | 1.5/0 | smooth |
| 7 | DATEM | soya protein | 1540 | 2.2/0 | smooth |

Each emulsion contains 2% DATEM and 2% proteins. (except for example 6 which contains 1% caseinate). The stability of these compositions is markedly improved as can be seen from the reduced serum and oil separation after centrifugation.

In all three examples the structures are smooth and the viscosity is markedly increased compared to examples 1 to 4 when only the single emulsifiers are used.

All these compositions are heat-stable.

Example 8: Mayonnaise without egg yolk

For a 30 kg batch of mayonnaise, 4% skim milk powder, 6.3% DATEM paste (2% DATEM+4.3% water), salt, sugar and spices are dissolved in 10.2% water at room temperature. Sunflower oil, 68%, is added slowly under vacuum and emulsified. Then 7% vinegar (11% acetic acid) is added and mixed. The stability, viscosity and texture are similar to that of a mayonnaise made with egg yolk, while the taste is clean and without off-taste.

Example 9: Sweet mayonnaise spread

For a 30 kg batch of spread containing 14.2% sugar, 2.5% cacao, 4% hazelnut spread, 3% skim milk powder and 6.3% DATEM paste, all the ingredients except the oil and vinegar are dissolved in 9.8% of water. The oil, 57%, and 2.5% vinegar are added as described above. The product has a very high viscosity, with smooth and stable texture and sweet chocolate taste.

Example 10; Hollandaise Sauce without egg yolk

For a 4 kg batch of Hollandaise Sauce containing no egg yolk, 0.5% skim milk powder, 2.5% DATEM paste and the dry materials (sugar, starch, xanthan, spices), are dissolved in 64% water at room temperature. The butter, 10%, and 12.5% soya oil are heated to 50° C. and emulsified with the water phase after which 0.3% vinegar is added. It is then homogenized and the product is either UHT treated (140° C., 6 sec) or sterilised (110° C., 10 min). After cooling, the product is reheated in a microwave oven or hot plate as described above. The product has similar viscosity, heat stability and taste to that made with 4% egg yolk modified by Phospholipase A2 enzyme.

Similar results as above are obtained with soya protein or caseinate in combination with DATEM.

The emulsion made with DATEM alone as emulsifier was heat-stable but too thin, and that made with skim milk powder alone had high viscosity, but was not heat-stable.

We claim:

1. In a process for preparing an emulsion wherein a food-grade oil and water and an emulsifier are combined to obtain oil and aqueous phases which are emulsified and wherein the emulsion has a pH of from 3 to 8 and does not comprise egg yolk, the improvements comprising, for preparing the emulsion so that the emulsion is heat-stable:

preparing an aqueous mixture with ingredients which comprise protein, which do not comprise egg yolk protein, and which comprise diacetyl tartaric acid ester of monoglyceride ("DATEM") and at least one of salt and sugar to obtain an aqueous mixture, adding the oil to the aqueous mixture to obtain the oil and aqueous phases and emulsifying the phases to obtain a first emulsion composition and then adding vinegar to the first emulsion composition to obtain a second emulsion composition so that, by weight based upon the second emulsion composition weight, the amounts of the oil, protein, DATEM and vinegar for preparing the second composition, and so that the second composition is heat-stable, are from 5% to 75% oil, from 0.1% to 10% protein, from 0.1% to 5% DATEM and from 0.1% to 10% vinegar.

2. A process according to claim 1 further comprising subjecting the second composition to a heat-treatment selected from the group consisting of pasteurization and sterilization.

3. A process according to claim 1 further comprising homogenizing the second composition to obtain a homogenized emulsion composition.

4. A process according to claim 3 further comprising subjecting the homogenized composition to a heat treatment selected from the group consisting of pasteurization and sterilization.

5. A process according to claim 4 wherein the oil amount is from 5% to 50% and the oil comprises from 1% to 30% butter fat.

6. The heat-treated composition of the process of claim 5.

7. The heat-treated composition of the process of claim 2 or 4.

8. A process according to claim 1 wherein the protein is provided by a substance selected from the group consisting of casein, whey protein, pea protein, soya protein and skim milk powder and mixtures thereof.

9. A process according to claim 8 wherein the protein substance is skim milk powder.

10. A process according to claim 1 wherein the protein amount is from 2% to 5% and the DATEM amount is from 2% to 3%.

11. The second composition of the process of claim 10.

12. A process according to claim 1 wherein the ingredients further comprise an aroma ingredient.

13. A process according to claim 1, wherein the oil amount is from 50% to 75% and the second composition has a pH of from 3 to 5.

14. The second composition of the process of claim 13.

15. A process according to claim 1 wherein the second composition does not comprise a substance other than the protein and DATEM for obtaining emulsion physical stability and as an emulsifier.

16. The second composition of the process of claim 15.

17. The second composition of the process of claim 1.

18. A heat-stable oil-in-water emulsion composition which does not comprise egg yolk and which does comprise food-grade edible oil, water and vinegar components and protein and diacetyl tartaric acid ester of monoglyceride ("DATEM") ingredients, wherein the protein does not comprise egg yolk protein, and which does comprise at least one ingredient selected from the group consisting of sugar and salt, wherein amounts of the components and ingredients comprising the emulsion are, by weight based upon the emulsion weight, from 5% to 75% oil, from 0.1% to 10% vinegar and from 0.1% to 10% protein and from 0.1% to 5% DATEM so that the emulsion is heat-stable and so that the emulsion has a pH of from 3 to 8.

19. A composition according to claim 18 wherein the protein amount is from 2% to 5% and the DATEM amount is from 2% to 3%.

20. A composition according to claim 18 which is pasteurized.

21. A composition according to claim 18 which is sterilized.

22. A composition according to claim 18 wherein the protein is provided by a substance selected from the group consisting of casein, whey protein, pea protein, soya protein and skim milk powder and mixtures thereof.

23. A composition according to claim 22 wherein the protein substance is skim milk powder.

24. A composition according to claim 18 wherein the oil amount is from 50% to 75% and wherein the composition has a pH of from 3 to 5.

25. A composition according to claim 18 wherein the oil amount is from 5% to 50% and the oil comprises butter fat in an amount of from 1% to 30%.

26. A composition according to claim 18 wherein the composition further comprises an aroma ingredient.

27. A composition according to claim 18 wherein the composition does not comprise a substance other than the protein and DATEM for obtaining emulsion physical stability and as an emulsifier.

* * * * *